(12) United States Patent
Maass

(10) Patent No.: US 6,390,530 B1
(45) Date of Patent: May 21, 2002

(54) CONVERTIBLE VEHICLE WITH A FOLDABLE ROOF

(75) Inventor: Joachim Maass, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/745,165

(22) Filed: Dec. 20, 2000

(30) Foreign Application Priority Data

Dec. 24, 1999 (DE) .......................................... 199 63 149

(51) Int. Cl.$^7$ .................................................. B60J 7/00
(52) U.S. Cl. ............................ 296/107.09; 296/109.08; 296/136
(58) Field of Search ....................... 296/107.09, 107.08, 296/136

(56) References Cited

U.S. PATENT DOCUMENTS

| | | | | |
|---|---|---|---|---|
| 1,748,736 A | * | 2/1930 | Selje ...................... | 296/107.08 |
| 2,747,928 A | * | 5/1956 | Olivier et al. .............. | 296/107 |
| 4,573,732 A | * | 3/1986 | Muscat ....................... | 296/108 |
| 4,746,163 A | * | 5/1988 | Muscat .................. | 296/107.08 |
| 5,004,291 A | * | 4/1991 | Bauer et al. ................ | 296/116 |
| 5,033,789 A | * | 7/1991 | Hayashi et al. ........ | 296/107.08 |
| 5,267,769 A | * | 12/1993 | Bonne et al. ........... | 296/107.08 |
| 5,533,777 A | * | 7/1996 | Kleemann et al. ..... | 296/107.08 |
| 5,551,743 A | * | 9/1996 | Klein et al. ................. | 296/136 |
| 5,743,587 A | * | 4/1998 | Alexander et al. .......... | 296/108 |
| 5,769,483 A | * | 6/1998 | Danzl et al. ........... | 296/107.08 |
| 5,772,274 A | * | 6/1998 | Tokarz .................. | 296/107.09 |
| 5,785,375 A | * | 7/1998 | Alexander et al. .......... | 296/108 |
| 5,810,422 A | * | 9/1998 | Corder et al. ................ | 296/108 |
| 5,967,590 A | * | 10/1999 | Beierl et al. ........... | 296/107.08 |
| 6,039,382 A | * | 3/2000 | Mather et al. ......... | 296/107.08 |
| 6,102,771 A | * | 8/2000 | Poznick et al. ........ | 296/107.17 |
| 6,139,087 A | * | 10/2000 | Wolfmaier et al. .... | 296/107.05 |
| 6,283,532 B1 | * | 9/2001 | Neubrand .............. | 296/107.07 |
| 6,293,605 B2 | * | 9/2001 | Neubrand .............. | 296/107.08 |
| 6,299,233 B1 | * | 10/2001 | Mentink ................. | 296/107.09 |
| 6,318,793 B1 | * | 11/2001 | Rapin et al. ........... | 296/107.08 |
| 2001/0024050 A1 | * | 9/2001 | Schutt et al. ........... | 296/107.08 |
| 2001/0040386 A1 | * | 11/2001 | Miklosi et al. ........ | 296/107.08 |

* cited by examiner

*Primary Examiner*—Ken Patel
(74) *Attorney, Agent, or Firm*—Jordan and Hamburg LLP

(57) ABSTRACT

A convertible vehicle (1) with an unfoldable roof (2), which can be placed under a cover (5) in the open position and has at least one rear bracket (4), which rests on the cover (5) in the closed position of the roof (2), and is constructed in such a way that the opening motion of the roof (2) includes a combined lift/rotation motion (13) of the bracket (4).

11 Claims, 8 Drawing Sheets

CONVERTIBLE VEHICLE WITH A FOLDABLE ROOF

BACKGROUND OF THE INVENTION

Figure 1:
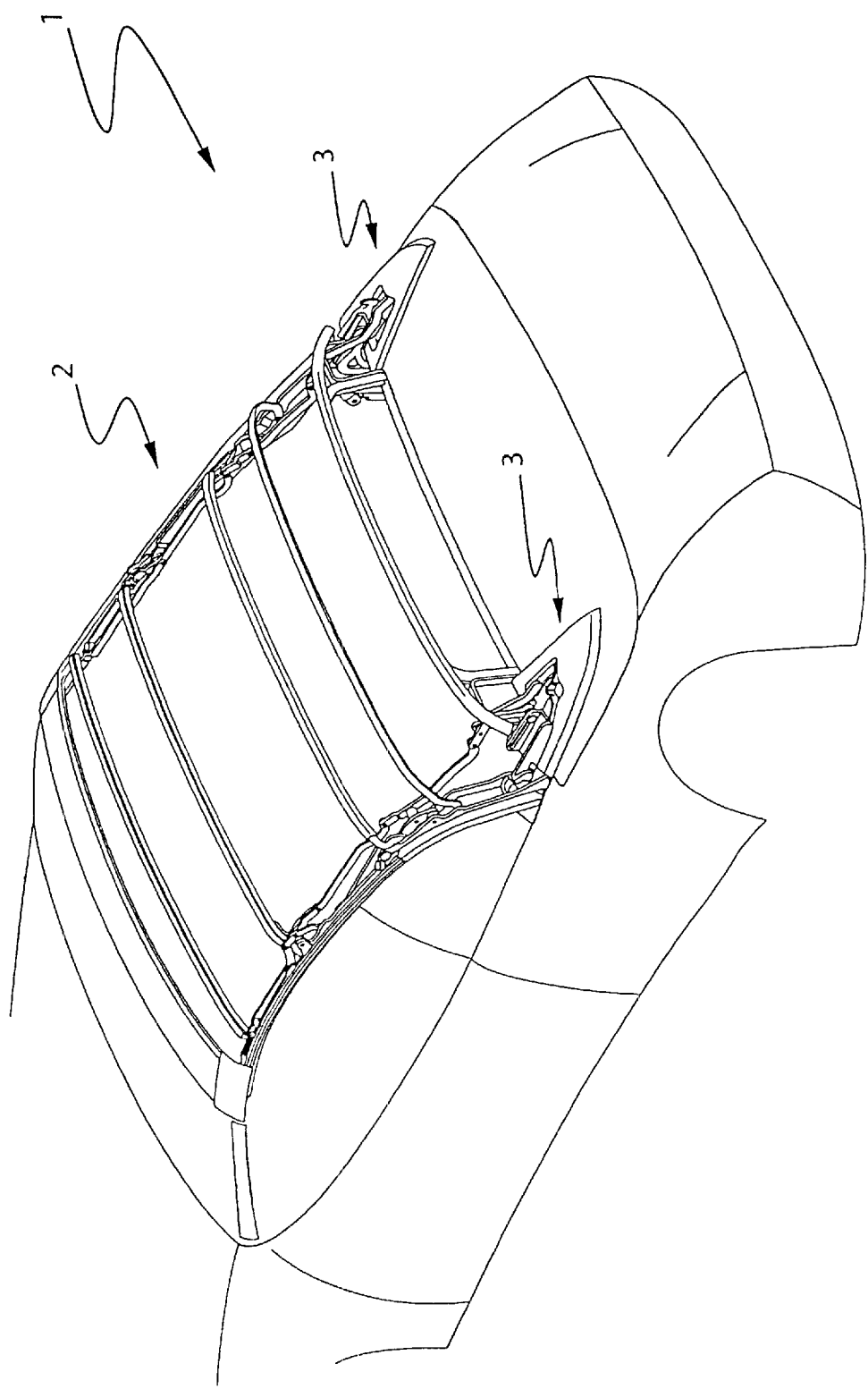

The invention concerns a convertible vehicle with a foldable roof that has at least one rear bracket.

Tops with rear brackets must be moved during opening in such a way that the brackets are first lifted from a support on which they rest when the roof is closed and can then be placed in a rear part of the vehicle with a downward motion. With some roof geometries, at least a partial area of the brackets can rest in front of an obstacle such as a step in the chassis or an additional component when in its closed position.

SUMMARY OF THE INVENTION

The object of the invention is to provide an interference-free and reliable opening mechanism for roof constructions of this kind.

Because the opening motion of the brackets is a lift/rotation motion, the brackets can be lifted over an obstacle, so that, for example, a swiveling axis around which the brackets are rotated and which rests beneath a step on the chassis side, can be lifted over the obstacle as a whole when the roof is opened.

If the roof is constructed as a so-called fin top with two essentially triangular brackets, when viewed from the top, there can be connected together with a cross support which increases stability, and the cross support, for example a tube or a similar object, can be located entirely under the window railing line so that it is not visible when the roof is closed. However, by using the lift/rotation motion according to the invention, the cross support can be lifted over an obstacle on the chassis side. This is especially advantageous with a rear window that can be lowered and which can be mounted in a module on the chassis side. Based on the invention, the side brackets with the cross support can then be moved over the upper edge of the module.

Additional advantages and details can be seen in the accompanying drawings and description.

IN THE DRAWINGS

Figure 2:
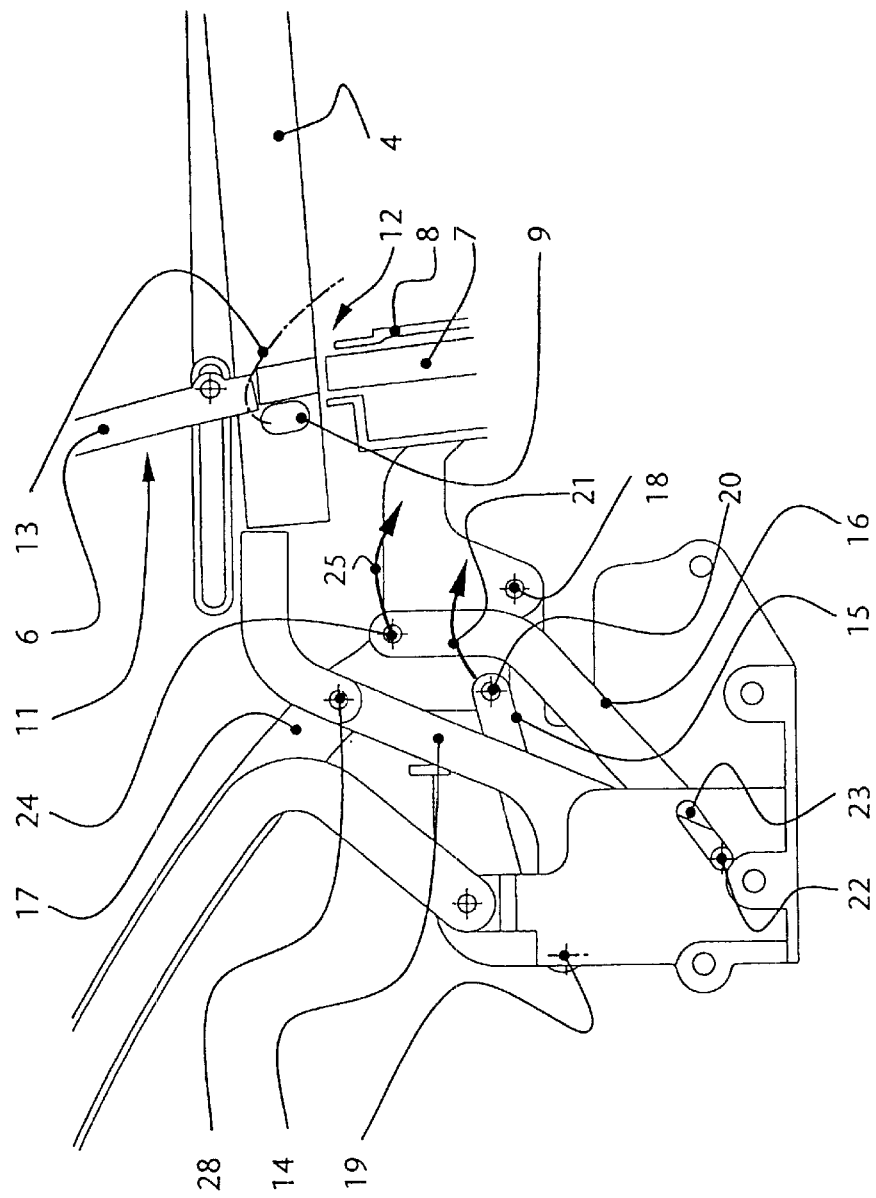
Figure 3:
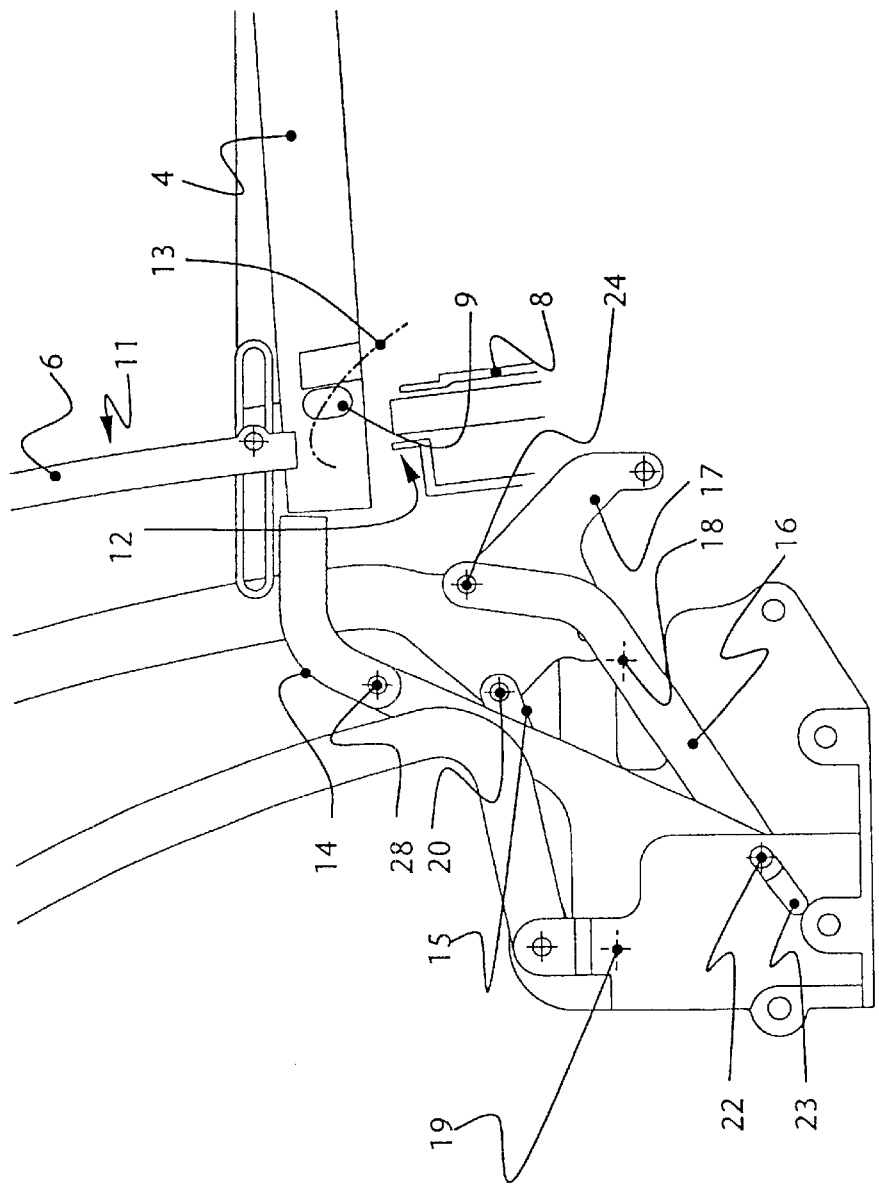
Figure 4:
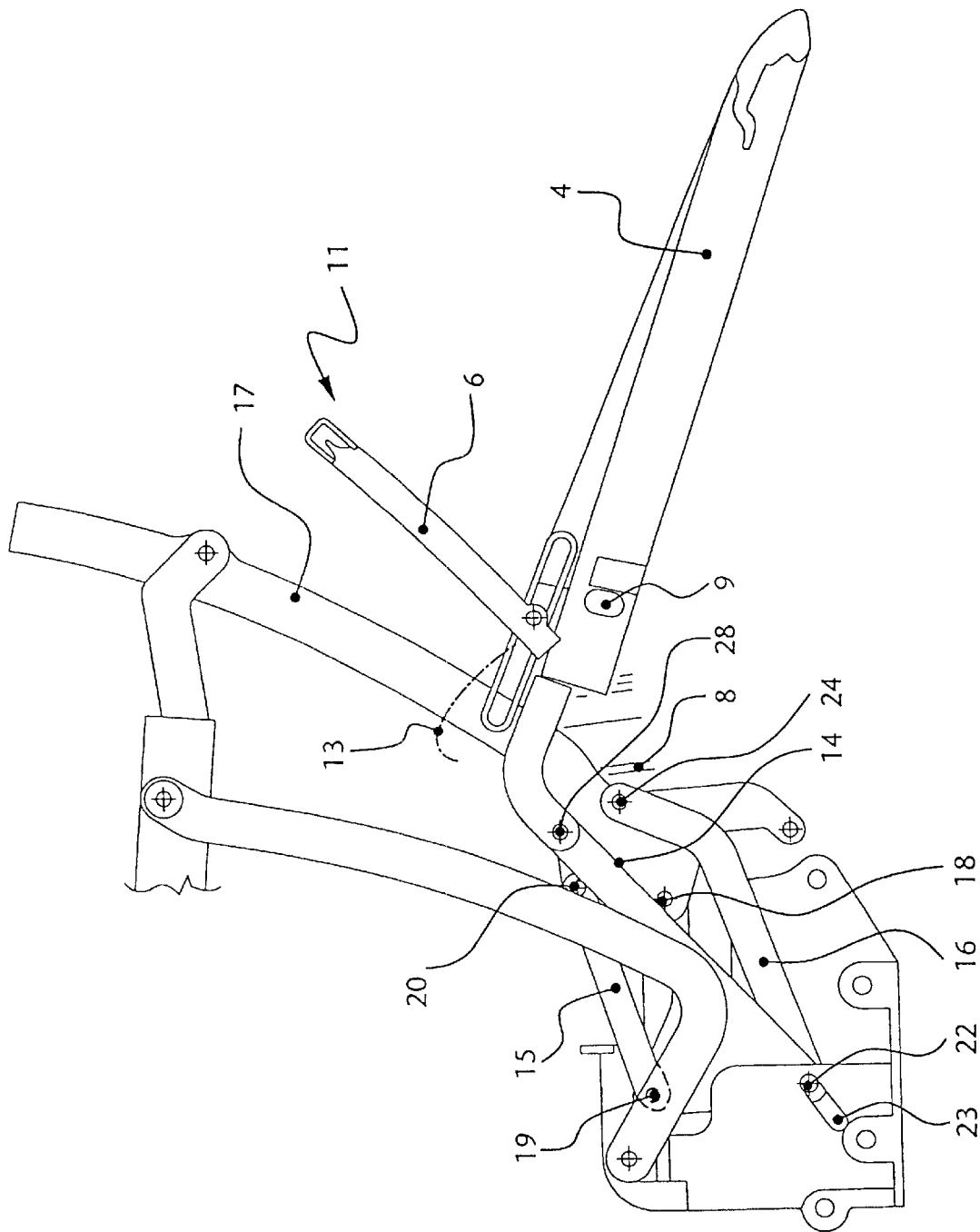
Figure 5:
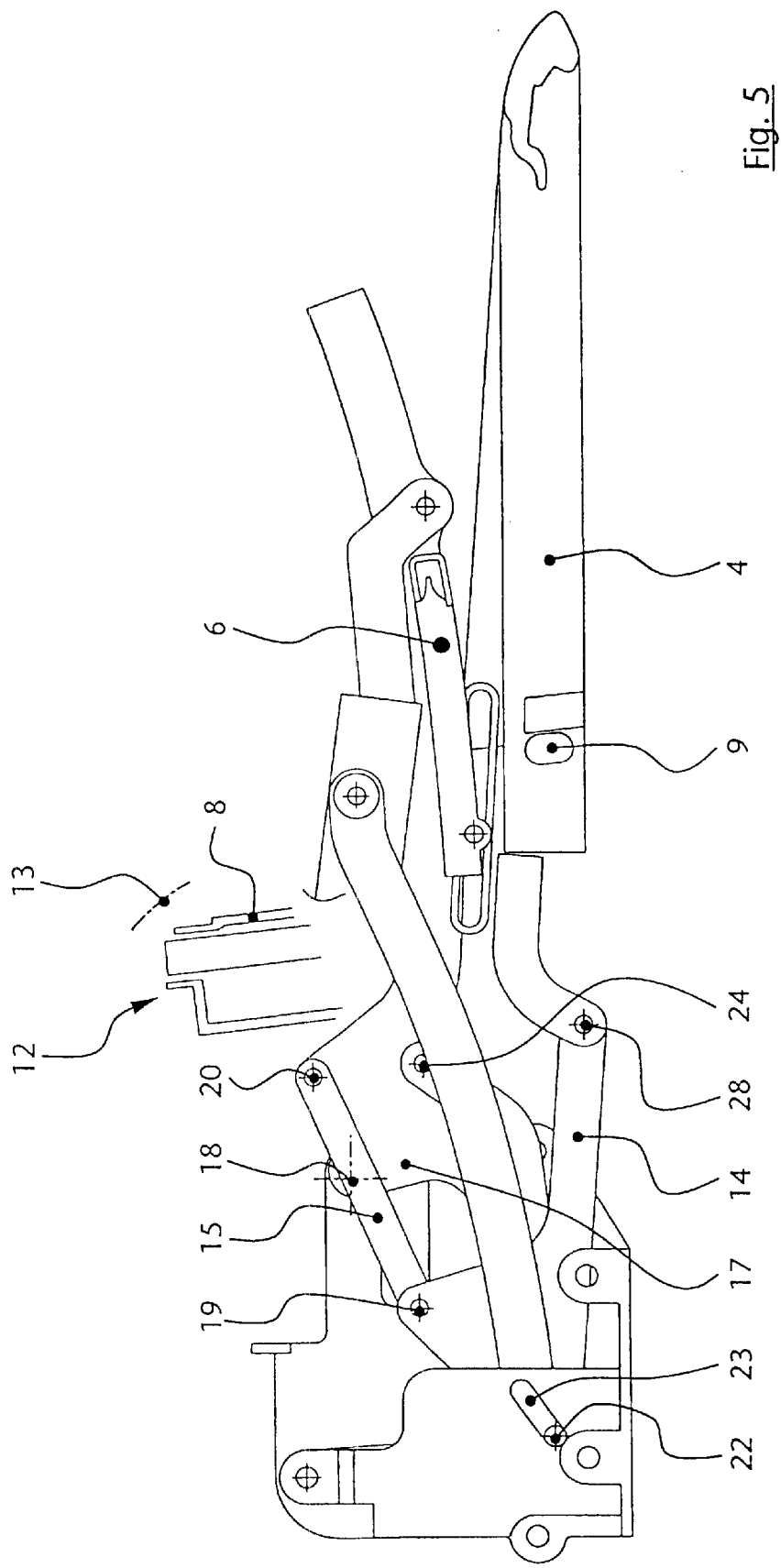
Figure 6:
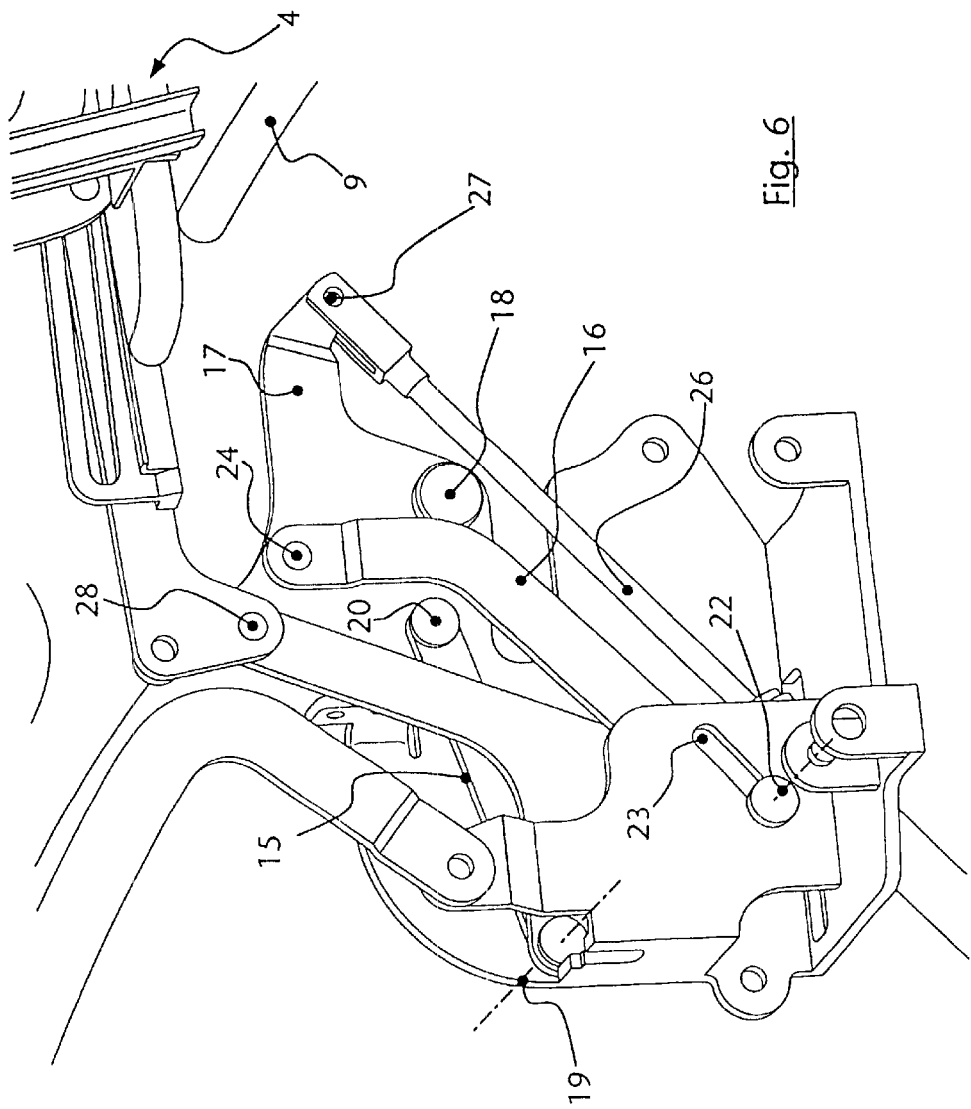
Figure 7:
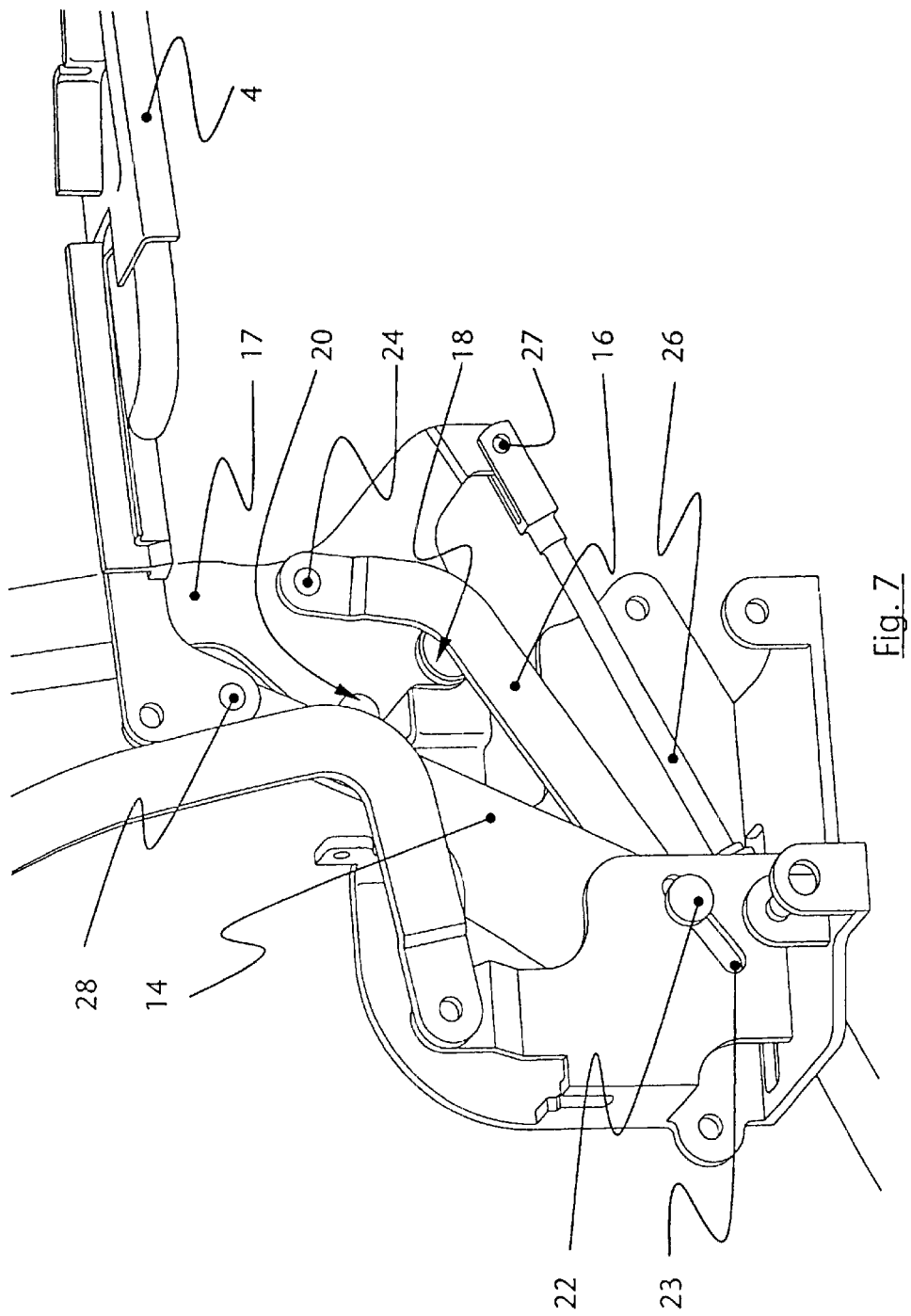
Figure 8:
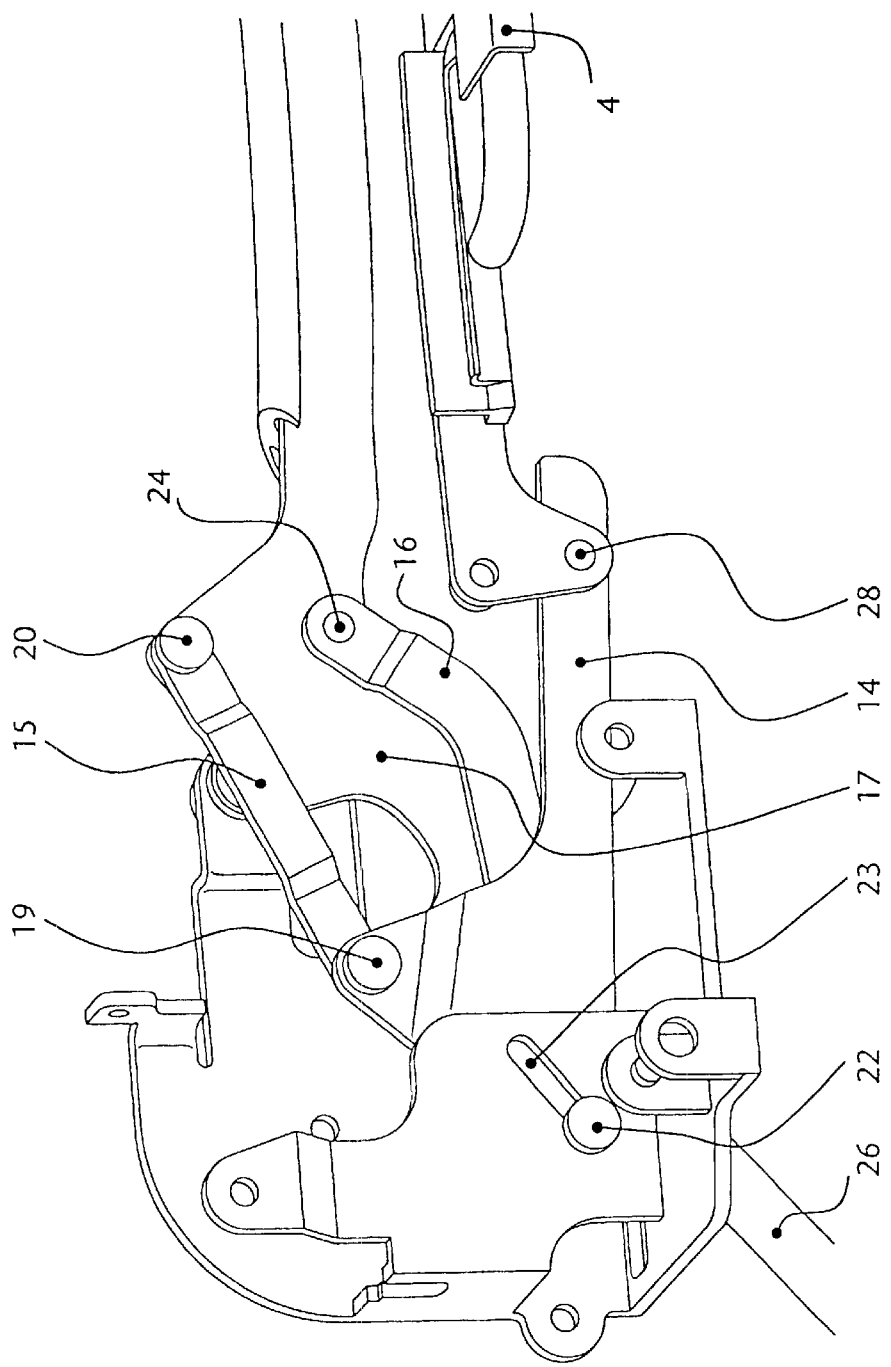

FIG. 1 shows a convertible vehicle according to the invention in a schematic perspective view, FIG. 2 shows a detail view of the linkage parts essentially corresponding to section II—II in FIG. 1, FIG. 3 shows a similar view to FIG. 2 when the brackets are opened, FIG. 4 shows a similar view to FIG. 3 as the opening of the roof proceeds further, FIG. 5 shows a similar view to FIG. 4 with the roof completely open, FIG. 6 shows the linkage parts according to FIG. 2 in the closed initial position, FIG. 7 shows the linkage parts in the position according to FIG. 3, and FIG. 8 shows the linkage parts in the position according to FIG. 5.

DESCRIPTION OF THE PREFERRED EMBODIMENTS

According to the illustrated embodiment, the convertible vehicle 1 has a roof 2 that consists of two back areas 3 with triangular shapes. These back areas 3 are supported by brackets 4, so-called fins, that will hold the roof 2 with a rear cover 5. The roof 2 can be constructed completely or partially as a flexible, textile cover 5a. When the roof 2 is in the closed position, the brackets 4 rest on the rear cover 5 and must be lifted off the rear cover 5 in order to make it possible to open the roof. When the rear cover 5 is open, the roof 2 and the rear brackets 4 can be moved as a whole into an area in the chassis of the vehicle in which it can be covered by the rear cover 5.

A rear window 6 is located forward of and between the brackets 4 and can be opened separately when the roof is in the closed position. In its lowered position 7, the rear window 6 is disposed in a box-shaped receptacle 8 on the chassis side.

The brackets 4 are connected with a cross support 9, for example a tube, in order to increase the stability of the roof. When the brackets are opened (FIGS. 2 and 3), the cross support 9 must pass through an intermediate area 10 between a roof-frame 11 and the upper edge 12 of the receptacle 8 on the chassis side.

In order to make this procedure possible, the cross support 9, which is firmly connected to the brackets 4, must be moved along a motion path 13, combining a superimposed lifting and a rotation motion. In order to assume optimal concealment of the cross support 9 in the closed state of the roof 2, the cross support 9 can be located underneath the rear cover 5. Based on its low position, the cross support 9 must first be lifted in order for it to clear the upper edge 12 of the receptacle 8 when opening the roof.

To enable the combined motion path 13, the brackets 4 are mounted so that they can rotate on control rods 14 each of which is in turn connected through a first intermediate guide rod 15 and a second intermediate guide rod 16 to a rear roof-frame part 17. The rear roof-frame part 17 can be rotated around a main bearing 18 on a side of the chassis 30, whereby the main bearing 18 is disposed in a fixed position on the chassis. A drive element 26 (e.g. FIG. 6), for example a hydraulic cylinder, provides for the rotation and is connected to the rear roof-frame part 17 with a pivot axle 27. At one end, the first intermediate guide rod 15 is connected to the control rod 14 through a pivot axle 19 and on the other end, it is connected to the rear roof-frame part 17 through another pivot axle 20. By rotating this roof-frame part 17 about the main bearing 18, a pulling motion is exerted on the pivot axle 20 in the direction of the arrow 21. In this way, the pivot axle 19 of the control rod 14 is moved simultaneously, so that a rotation motion is transmitted to the control rod 14.

Moreover, the control rod 14 is attached to a lower pivot axle 22 which forms a bearing disposed in a rocker 23 constructed as an elongated hole. Coaxially to the pivot axle 22, the second intermediate guide rod 16 is connected to the control rod 14. A pivot axle 24 at the other end of the intermediate guide rod 16 is also mounted to the rear roof-frame part 17 so that it can rotate. When the rear roof-frame part 17 is rotated about the main bearing 18, a pulling motion is exerted on the pivot axle 24 in the direction of the arrow 25, whereby the second intermediate guide rod 16 with its opposite end in the rocker 23 moves the pivot axle 22 of the control rod 14 upwardly. These two simultaneous motions result in the motion path 13.

The control rods 14 are not fixed on the chassis side 30, but are connected to the rear roof-frame part 17 merely through the first and second intermediate guide rods 15, 16.

The end of the control rod 14 opposite the pivot axles 19, 22 is connected to the rear brackets 4 and the cross support 9 through a link 28. Overall, the control rod 14 is constructed like a swan's neck, so that it allows the connection of the pivot axel 19 and the pivot axel 22 which forms a bearing at its end on the chassis side and is comprised of a gripping neck region extending to the rear bracket 4.

What I claim is:

1. A convertible vehicle, comprising:
   a roof (2) having a cover (5), said roof (2) having back areas (3);
   brackets 4 supporting said back areas of said roof (2) and being moveable between closed and open positions;
   a vehicle chassis (30) having bearings (18);
   roof frame parts (17) pivotably mounted on said bearings (18); and
   motion-path control and guide rods (14, 15, 16) connected between said roof-frame parts (17) and said brackets (4) providing for movement of said roof (2) between an unfolded and a folded position when said brackets (4) are moved between respective closed and open position, said motion-path control and guide rods (14, 15, 16) providing for movement of said brackets (4) along a combined motion path (13) which combines a lifting and rotation motion upon movement of said roof (2) from its closed position to its open position.

2. A convertible vehicle according to claim 1, wherein there are two spaced brackets (4) supporting the back areas (3) of said roof, said roof further comprising:
   a rear window (6) arranged forward of and between said two spaced brackets (4); and
   a cross support (9) for connecting said two spaced brackets (4) together.

3. A convertible vehicle according to claim 2, wherein said roof further comprises a receptacle (8) into which said rear window (6) is movable when said roof is in its closed position, said cross support (9) being situated forward of an upper edge (12) of said receptacle (8) when said roof (2) is in its closed position.

4. A convertible vehicle according to claim 2, further comprising:
   a receptacle (8) into which said rear window (6) is movable when said roof is in its closed position, said cross support (9) being situated forward of an upper edge (12) of said receptacle (8) when said roof is in its closed position.

5. A convertible vehicle according to claim 1, wherein said motion-path control and guide rods (14, 15, 16) comprise movable control rods (14) attached to said brackets (4).

6. A convertible vehicle according to claim 5, wherein each of said motion-path control and guide rods further comprises a first intermediate guide rod (15) having a first end region connected to a first end (19) of said control rod (14) and a second end region (28) connected to said roof-frame part (17) whereby rotation of said roof-frame part (17) causes rotation of said control rod (14).

7. A convertible vehicle according to claim 6, wherein each of said motion-path control and guide rods (14, 15, 16) further comprise an articulated axle having a bearing (22) arranged at a second end of said control rod (14) opposite said first end (19) of said control rod (14), said bearing (22) being movable in an elongated aperture (23) to thereby enable movement of said bracket (4) in the upward direction substantially simultaneously upon movement of said roof from its closed position to its open position; and
   a second intermediate guide rod (16) having a first end region (24) connected to said roof-frame part (17) and a second end region connected to said second end (22) of said control rod (14).

8. A convertible vehicle according to claim 7, wherein said control rod (14) has a first end (28) connected to said bracket (4) and a second end attached only via said first and second intermediate guide rods (15, 16) to said chassis (30) of the vehicle.

9. A convertible vehicle according to claim 5, wherein each of said motion-path control and guide rods further comprises an articulated axle having a bearing (22) arranged at one end of said control rod (14), said bearing (22) being movable in an elongate aperture (23) to thereby enable movement of said bracket (4) in the upward direction substantially simultaneously upon movement of said roof from its closed position to its open position.

10. A convertible vehicle according to claim 1, wherein each of said motion-path control and guide rods further comprises a movable control rod (14) rotatably attached to said bracket (4), a first intermediate guide rod (15) pivotally connected at a first end (19) to said control rod (14) and at a second end (20) to said roof-frame part (17) and a second intermediate guide rod (16) connected at a first end (22) to said side control rod (14) and pivotally connected at a second end (24) to said roof-frame part (17).

11. A convertible vehicle according to claim 10, wherein each of said motion-path control and guide rods further comprises an articulated axle (22) having a bearing movable in an elongate aperture (23), said control rod (14) and said first end (22) of said second intermediate guide rod (16) being connected to said articulated axle (22).

* * * * *